Figure 1:
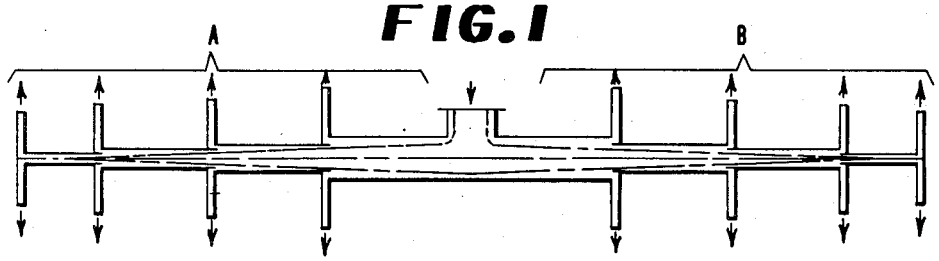

Sept. 17, 1963  B. T. SHARP  3,103,942
APPARATUS AND PROCESS FOR DISTRIBUTING VISCOUS LIQUIDS
Filed Sept. 22, 1961  2 Sheets-Sheet 1

INVENTOR
BENJAMIN THOMAS SHARP

BY Harry E. Braddock
ATTORNEY

Sept. 17, 1963  B. T. SHARP  3,103,942
APPARATUS AND PROCESS FOR DISTRIBUTING VISCOUS LIQUIDS
Filed Sept. 22, 1961  2 Sheets-Sheet 2

INVENTOR
BENJAMIN THOMAS SHARP
BY Harry C. Braddock
ATTORNEY

United States Patent Office 3,103,942
Patented Sept. 17, 1963

3,103,942
APPARATUS AND PROCESS FOR DISTRIBUTING VISCOUS LIQUIDS
Benjamin Thomas Sharp, Forwood, Wilmington, Del., assignor to E. I. du Pont de Nemours and Company, Wilmington, Del., a corporation of Delaware
Filed Sept. 22, 1961, Ser. No. 139,935
7 Claims. (Cl. 137—1)

This invention relates to control of the flow of liquids in conduits and more particularly to the flow and distribution of viscous liquids under laminar flow conditions from a single source to a plurality of delivery ports.

Systems for distributing liquids from a single source to a plurality of discharge points are common and various systems have been employed in an attempt to provide even distribution of the liquid. A tree-like cascade manifold is one known convenient way of dividing a main stream of liquid into several streams.

Generally no difficulty is encountered in the use of the known systems for distribution where the liquid is of low viscosity and relatively stable. However, with highly viscous, relatively unstable systems such as encountered in the handling of molten streams of high polymers such as nylon and polyethylene terephthalate, the problem of maintaining equal residence time in a distribution system for the various streams become severe. This is particularly true in the distribution of a molten polymer such as nylon to a plurality of devices having extrusion orifices since the physical properties of the polymer change with time at high temperature. The differences in residence times of the various streams leads to non-uniformities in the final products of the extrusion orifices. While some progress has been made in solving this problem, the distribution systems proposed are usually complex and expensive in construction and, in addition, cause undesirably high pressure drops.

It is an object of this invention to provide an improved process and apparatus for distribution of viscous liquids from a single source to a plurality of delivery ports.

Another object is to provide a simple, economical, and easily constructed apparatus for accomplishing this purpose.

A further object is to provide such a process and apparatus in which pressure drop is minimized.

Other objects will become apparent from the description and discussion to follow.

The above objects are accomplished by a process comprising the steps of supplying a substantially homogeneous, viscous liquid to the inlet of a conduit having a plurality of outlets at spaced intervals along the length thereof; causing the liquid to flow through the conduit and out of the various outlets; at each successive outlet separating the slower moving peripheral fluid flowing near the wall of the conduit from the faster moving fluid in the center of the stream, collecting and passing the peripheral fluid through the outlet, the central portion of the stream being passed on to the next outlet.

The improved apparatus of the invention comprises a conduit system or manifold having an inlet and a plurality of outlets spaced at intervals along the length of the conduit and means positioned within the conduit at each outlet to separate the slower moving peripheral fluid near the wall of the conduit from the faster moving central portion of the fluid stream, collect and direct the peripheral fluid to the outlet.

Figure 2:
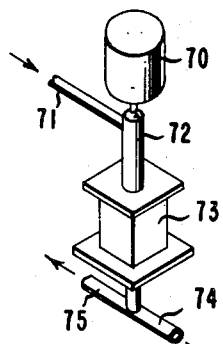
Figure 3:
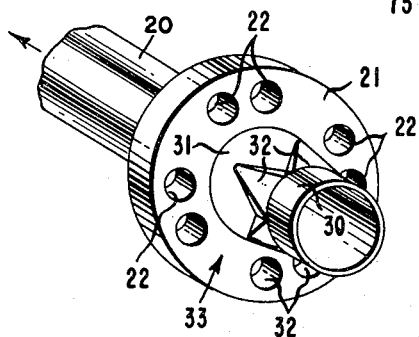
Figure 4:
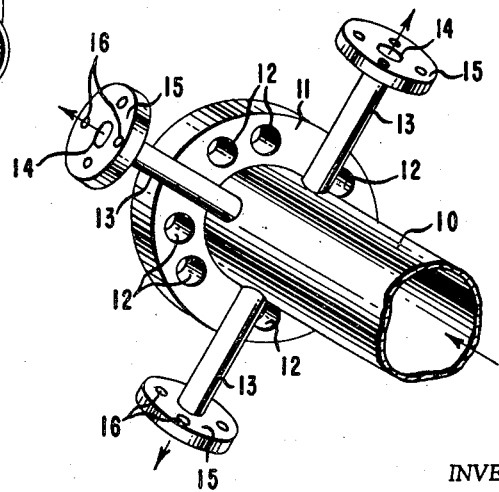
Figure 5:
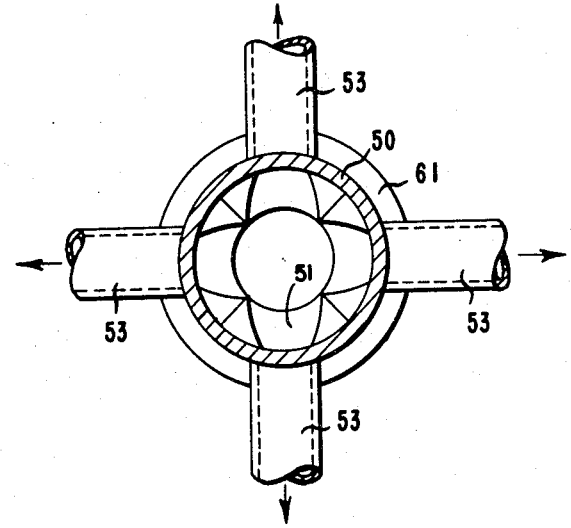
Figure 6:
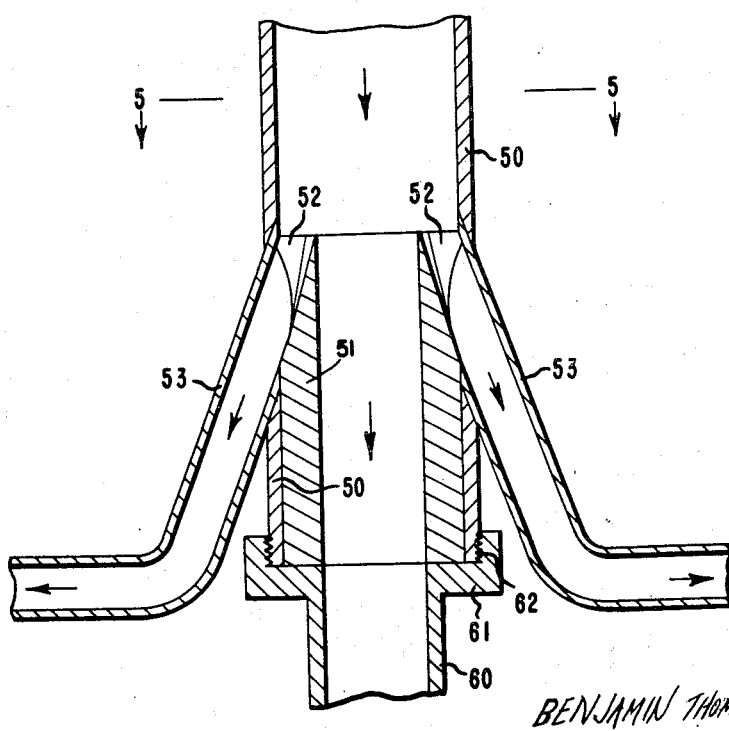

Reference may be made to the accompanying drawings in which:

FIGURE 1 is a schematic longitudinal cross-sectional view of the manifold of the present invention, FIGURE 2 is a perspective view illustrating a viscous liquid mixing device in the liquid stream just prior to entry into the manifold unit, FIGURE 3 and FIGURE 4 represent a detailed illustration of two disconnected sections of a manifold conduit arrangement showing the construction of the device at the outer fluid separation and distribution point, FIGURE 5 is an end view of the upstream end of a modified version of the unit shown in FIGURE 3, the view taken at lines 5—5 of FIGURE 6, FIGURE 6 is a longitudinal sectional view of the unit shown in FIGURE 5.

The process and apparatus of this invention take advantage of the fact that viscous liquid flowing in pipe lines flow with a parabolic distribution of fluid velocity across the cross-section of the pipe so that the fluid close to the walls of the pipe is moving at a relatively low velocity in comparison with the liquid in the center. By removing the slow moving peripheral fluid near the walls of the pipe at each successive outlet the uniformity of the fluid issuing from the various outlets is greatly improved. Thus the present invention takes advantage of a characteristic which usually contributes to non-uniformity to actually increase the uniformity of residence time of the material being delivered to the various outlets.

One embodiment of the apparatus is shown schematically in FIGURE 1. Here the conduit system has two branches, A and B of equal length each branch having 4 outlet zones, each outlet zone is shown supplying two branch outlets. In the handling of molten polymer it is generally preferred to have each outlet zone supply four extrusion positions equally spaced therefrom as illustrated in FIGURES 3 and 4 which show details of the annular joints which separate the peripheral fluid passing into the outlets.

In FIGURES 3 and 4 the tubular element 10 is the upstream portion of the manifold conduit which is joined by suitable means with tubular element 20 which forms the downstream portion of the manifold conduit to constitute one of the liquid collection zones. Tubular element 10 is provided with an annular flange 11 which is adapted to be rigidly secured to annular flange 21 of tubular element 20. The flanges are preferably bolted together to form a tight joint. A plurality of transversely extending conduit outlet elements 13 intersect tubular element 10 adjacent flange 11 to provide passageways 14 connected into the interior of tubular element 10 for conducting away liquid from the collection zone. Outlet elements 13 are provided with flanges 15 so that suitable connections can be made to move the liquid to its use point. Conduit element 20 is provided with a protruding element 33 having a first portion 31, which is closely fitted and slidably received in the interior of the flanged end of conduit element 10. The protruding end of element 33 is provided with an annular cutaway second portion forming a thin sleeve 30 of an outside diameter somewhat smaller than the inside diameter of conduit element 10 into which it is fitted upon assembly of the conduit element. The first portion 31 of element 33 is provided at its upstream edge adjacent portion 30 with a plurality of circumferentially spaced triangular cutaway portions 32 of gradually varying depth. These portions are so spaced and aligned that they coincide, upon assembly of the two conduit portions, with the intersections of passageways 14 with the interior of conduit element 10.

It will be apparent from the indicated direction of liquid flow that the liquid in the outer slower moving peripheral portion of conduit element 10 will pass radially outward of the sleeve portion 30 and be directed by the inclined triangular cutaway portions 32 to move into passageways 14 in outlet conduit elements 13. It will be seen as the liquid moves outwardly in each branch of the manifold, conduit, the slower moving portion is collected and diverted at each outlet zone.

When using an apparatus of the type illustrated the annular sleeve which separates the peripheral fluid preferably should extend upstream of the conduit at least to a point where a plane passing through the inlet edge of the sleeve perpendicular to the longitudinal axis is tangent to the leading edge of the discharge port. The volume of each successive conduit is decreased after each discharge point.

Although substantial improvements in uniformity of residence time may usually be obtained in an empirical fashion by removal of the peripheral fluid to supply each successive outlet, for best results the dimensions of the various parts of the manifold system should be properly adjusted relative to one another and to the particular fluid which is to be employed. If the position of the outlets is fixed by machine gage, as in polymer extrusion, or by other considerations, the amount of peripheral fluid to be removed at each outlet and the internal diameters of the pipe between the outlets may be calculated for a given fluid to provide substantially equal residence time for the polymer issuing from the various outlets. Such calculations are readily made by those skilled in the art using well-known equations for velocity distribution in pipelines under conditions of laminar flow. If it is possible to vary the position of the outlets, then the diameters of the various pipe sections may be selected as desired, usually in accordance with standard pipe sizes, and the length of pipe between the outlets required to give substantially equal residence time calculated for the fluid system under consideration.

The uniformity of residence time of the fluid issuing from the various outlets of the manifold may be determined by various means depending on the system under consideration. In the case of polymers which increase in viscosity with time, variations in viscosity will indicate non-uniform residence time. In other situations a suitable dye may be injected and the time required for the dye to appear at the various outlets measured.

In order to obtain the maximum benefit from the manifold of this invention, it is obviously necessary that the fluid entering the manifold be uniform. Since this type of manifold is primarily useful for viscous fluids, the entering fluid will not be uniform unless special means are taken to insure uniformity at this point. It is therefore, desirable that the fluid be passed through some suitable mixing or blending device just prior to entering the manifold. For this purpose an in-line mixer 72, 73 driven by motor 70 may be located as shown in FIGURE 2 between an inlet conduit 71 and the manifold unit 74, 75, a helical ribbon mixer being the preferred type for this purpose.

FIGURES 5 and 6 illustrate a preferred embodiment of the manifold collection zone structure of this invention. This structure and its function are generally similar to the structure of FIGURES 3 and 4. The upstream portion of the manifold conduit is formed by tubular element 50, which is secured to tubular element 60 by means of the threaded portion 62 in radially extending flange 61. Tubular element 50 is provided with a plurality of outlet conduit elements 53 inclined with respect to the axis of element 50. Elements 53 are secured in openings formed in the cylindrical wall of element 50 by any suitable means such as welding, brazing, or rigid frictional fit.

Closely fitted into the end of tubular element 50 is a hollow sleeve member 51 which is secured in position by suitable means. The upstream end of member 51 is cutaway as shown in FIGURES 5 and 6 to form four circumferentially spaced outwardly inclined liquid directing channels 52. These channels force the liquid flowing in the outer peripheral portions of conduit element 50 outwardly and divide the portions into four outwardly directed streams which then move into outlet conduits 53. The liquid in the central portion of conduit element 50 continues straight through sleeve member 51 into conduit element 60.

It is desirable although not necessary, that the manifold be constructed with joints at each outlet so that it may be readily disassembled for cleaning. The manifold must also be designed so that there are no pockets or other areas for accumulation of stagnant fluid.

The primary advantages of the manifold structure of this invention are the combination of uniform residence time, low average residence time and low pressure drop. The following table illustrates the advantages of the manifold of this invention A over a more conventional tree-like cascade type manifold B in distributing molten 66 nylon polymer having a viscosity of 554 poises to eight outlet positions, each supplying four spinning positions. As can be seen from the table the average polymer residence time is slightly lower for the manifold of this invention, and the pressure drop is much lower. The uniformity of residence time was also significantly better for manifold A.

| | A | B |
| --- | --- | --- |
| Average Polymer Residence Time (Min.) | 2.4 | 2.6 |
| Pressure Drop (p.s.i.) | 112-164 | 500 |

In addition to the above advantages, the manifold of this invention is well suited to economical unitary heating jacket design. For this reason the cost of fabrication is generally lower for this type of manifold than for the more complex manifolds of the prior art. Easier cleaning of the manifold of this invention, likewise, results in the lower maintenance cost.

The process and apparatus of this invention may be used to advantage in the distribution of any viscous liquid where uniform residence time is desirable but are particularly useful for the distribution of polyamides such as 66-nylon and 6-nylon which are produced on a commercial scale and may obviously be used equally well for the various other polyamides which are well-known to the art and for other viscous polymers such as the polyesters, polyolefins, polyurethanes etc.

It is to be understood that the foregoing description is by way of example only and that various modifications and changes in the details may be made without departing from the spirit of the invention and the scope of the following claims.

I claim:

1. An improved manifold apparatus for the distribution of viscous liquids from a single inlet to a plurality of outlet points spaced therefrom, said apparatus comprising a plurality of substantially linear hollow main conduit units arranged and aligned in sequence, each of said units joined to the preceding and following downstream units by a connecting means, the first upstream unit in the sequence provided with an inlet for receiving liquid to be distributed, each of said units provided in a limited annular zone intermediate its ends with a plurality of circumferentially spaced transverse passageways through said main conduit unit, a plurality of outlet conduits each secured to each said main unit and aligned in communication with one of said transverse passageways, sleeve means secured in said main conduit units adjacent said annular zones and constructed and arranged to separate an annular outer portion of liquid moving near the inner surface of said main conduit unit from the liquid moving in central portion of said main conduit unit, circumferentially divide and direct said separated outer annular portion into at least one separate stream, and direct each of said streams to and through one of said transverse passageways and one of said outlet conduits to one of said outlet points while permitting liquid in the central portion of the main conduit to proceed to the next main conduit unit, the last downstream main unit directing the entire remaining liquid stream through its transverse passageways and outlet conduits to its outlet points, the number of said main conduit units, the dimensions of said main conduit units, and the dimensions of said sleeve means selected to control the amount of liquid separated in each unit such that the residence time of liquid in the apparatus is substantially the same for liquid arriving at all of said outlet points.

2. The improved apparatus of claim 1 in which each of said main units in sequence is provided with a smaller interior transverse cross section than the preceding upstream unit.

3. The improved apparatus of claim 2 in which said fixed sleeve means comprises a tubular element comprising a first hollow portion inside said main conduit unit downstream of said transverse passageways, and a second hollow portion inside said main conduit extending from said first portion in an upstream direction to a point upstream of said transverse passageways, the upstream end of said second hollow portion having an outside surface spaced inwardly from the inside of said main conduit unit, the downstream end of said second hollow portion of said tubular element provided with a plurality of circumferentially spaced inclined longitudinal channels connecting said outside surface of said upstream end of said second hollow portions with each of said transverse passageways in said main conduit unit.

4. The improved apparatus of claim 3 in which said tubular element hollow portions are provided with a central passageway of substantially the same size as the interior of the following downstream main conduit unit.

5. The improved apparatus of claim 3 in which the tubular element is shaped as the frustum of a cone.

6. An improved process for uniformly distributing viscous high polymer liquids from a single inlet point to a plurality of outlet points spaced therefrom, said process comprising moving a stream of viscous high polymer liquid at a given average velocity from an inlet point through a series of separation zones in a closed conduit so that the moving liquid stream comprises a first annular exterior portion adjacent the conduit wall and a more rapidly moving central inner portion, at each separation zone separating an annular exterior portion from a central portion of said moving liquid, collecting said separated portion and directing it to an adjacent outlet point, and controlling the given average velocity and amount of liquid separated at each separation zone so that the time required for portions of the liquid to pass between the inlet point and any of the outlet points is substantially constant.

7. The improved process of claim 6 in which the remaining continuing moving portion of the liquid stream is reduced in transverse cross section simultaneously with separation of the annular exterior portion.

References Cited in the file of this patent
UNITED STATES PATENTS

| | | |
|---|---|---|
| 2,467,722 | Baker | Apr. 19, 1949 |
| 2,723,680 | Danel | Nov. 15, 1955 |

FOREIGN PATENTS

| | | |
|---|---|---|
| 269,945 | Germany | Feb. 3, 1914 |